United States Patent Office 3,210,390
Patented Oct. 5, 1965

3,210,390
17α-(2-ALKYNYL)ESTRA-1,3,5(10)-TRIENE-3,17β-DIOLS AND ESTERS CORRESPONDING
Sybil Piskur Meloy, Chicago, Ill.
(212 E. Kathleen Drive, Park Ridge, Ill.)
No Drawing. Filed Aug. 19, 1964, Ser. No. 390,718
12 Claims. (Cl. 260—397.5)

The present invention relates to 17-alkynylated steroids wherein the alkynyl group is unsaturated at a point two carbon atoms removed from the 17-carbon atom. More particularly, these novel compounds are 17α-(2-alkynyl)estra-1,3,5(10)-triene-3,17β-diols and the corresponding esters represented by the following structural formula

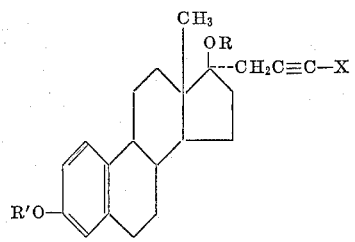

wherein R and R' can be hydrogen or a lower alkanoyl radical, and X is either hydrogen or a lower alkyl radical.

Examples of lower alkanoyl radicals encompassed by the R and R' terms are acetyl, propionyl, butyryl, valeryl, caproyl, and the branched-chain radicals isomeric therewith.

The lower alkyl radicals designated in the foregoing representation by X are exemplified by methyl, ethyl, propyl, butyl, pentyl, hexyl, and the branched-chain isomers thereof.

The compounds of this invention are conveniently produced by reaction of 3-hydroxyestra-1,3,5(10)-trien-17-one or a 3-(lower alkanoate) thereof with a suitable organometallic reagent wherein the organic portion is a lower 2-alkynyl radical. Examples of suitable reagents are 2-butynyl magnesium bromide and 2-propynyl zinc bromide. Illustrative of this process are the reactions of 3-hydroxyestra-1,3,5(10)-trien-17-one with 3-bromo-1-propyne and zinc in tetrahydrofuran followed by acidic decomposition of the adduct to afford 17α-(2-propynyl)-estra-1,3,5(10)-triene-3,17β-diol and also the reaction of 3-hydroxyestra-1,3,5(10)-trien-17-one with 2-butynyl magnesium bromide in ether to yield 17α-(2-butynyl)-estra-1,3,5(10)-triene-3,17β-diol.

Acylation of the instant 3,17-diols with a lower alkanoic acid anhydride or halide at room temperature, preferably in the presence of a suitable acid acceptor, affords the corresponding 3-(lower alkanoyl)oxy compounds while reaction of those diols with an isopropenyl ester at elevated temperature in the presence of an acid catalyst results in the 3,17-bis[(lower alkanoyl)oxy] derivatives. Illustrative of those processes is the reaction of 17α-(2-butynyl)estra-1,3,5(10)-triene-3,17β-diol with acetic anhydride and pyridine to afford 17α-(2-butynyl)estra-1,3,5(10)-triene-3,17β-diol 3-acetate and the acylation of 17α-(2-propynyl)estra-1,3,5(10)-triene-3,17β-diol with isopropenyl acetate in the presence of p-toluenesulfonic acid to produce 17α-(2-butynyl)estra-1,3,5(10)triene-3,17β-diol 3,17-diacetate.

Selective hydrolysis of the aforementioned 3,17-bis-[(lower alkanoyl)oxy] derivatives results in the instant 17-mono-(lower alkanoates). 17α-(2-propynyl)estra-1,3,5(10)-triene-3,17β-diol 3,17-diacetate, for example, is heated with aqueous potassium carbonate in an organic solvent medium of acetone and methanol to produce 17α-(2-propynyl)estra-1,3,5(10)-triene-3,17β-diol 17-acetate.

The compounds of this invention are useful in consequence of their valuable pharmacological properties. They are hormonal agents, for example, in view of their potent estrogenic properties and also their deciduogenic activity as evidenced by the ability to induce uterine endometrial decidual cell formation. The instant compounds are useful also as intermediates in the manufacture of the corresponding 17α-(2-alkenyl) substances described in U.S. Patent 3,107,257. 17α-(2-butynyl)estra-1,3,5(10)-triene-3,17β-diol 3-acetate, for example, is hydrogenated in pyridine solution utilizing a 5% palladium-on-carbon catalyst to yield 17α-(2-butenyl)estra-1,3,5(10)-triene-3,17β-diol 3-acetate.

The invention will appear more fully from the examples which follow. These examples are given by way of illustration only, and it will be understood that the invention is not to be construed as limited in spirit or in scope by the details contained therein as many modifications in materials and methods will be apparent from this disclosure to those skilled in the art. In these examples, temperatures are given in degrees centigrade (° C.) and quantities of materials in parts by weight unless otherwise noted.

*Example 1*

To a refluxing mixture of 27 parts of 3-hydroxy-estra-1,3,5(10)-trien-17-one, 33 parts of zinc metal, and 450 parts of tetrahydrofuran is added dropwise, with stirring, 60 parts of 3-bromo-1-propyne. The reaction mixture is then stirred at the reflux temperature for an additional 90 minutes following which time it is cooled, and the supernatant is decanted into a mixture of 2000 parts of water containing 120 parts of concentrated hydrochloric acid. That aqueous acidic mixture is extracted with chloroform, and the organic layer is separated, washed with water, dried over anhydrous sodium sulfate and stripped of solvent by distillation under reduced pressure. The resulting brown gummy residue is dissolved in a mixture of 160 parts of ethanol containing 52.5 parts of acetic acid, and 7.5 parts of Girard's-T reagent is added to that solution. That mixture is heated at the reflux temperature for about 30 minutes, then is cooled and poured into ice water. Extraction with a mixture of chloroform and isopropyl alcohol affords a solution which is dried over anhydrous sodium sulfate and concentrated to dryness at reduced pressure. The dark brown residue is washed with benzene, then is chromatographed on a silica gel column and eluted with 7–20% ethyl acetate in benzene mixtures. Further purification by dissolution in ether, decolorization of that ether solution with activated carbon, concentration to dryness and recrystallization from acetone-heptane affords pure 17α-(2-propynyl)estra-1,3,5(10)-triene-3,17β-diol, melting at about 162–165°. It displays an optical rotation of +44° in chloroform and an ultraviolet absorption maximum at about 280.5 millimicrons with a molecular extinction coefficient of about 1980. This compound can be represented by the following structural formula

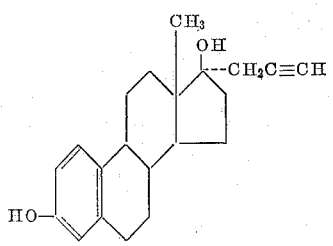

Example 2

A mixture of 1.2 parts of 17α - (2 - propynyl)estra-1,3,5(10)-triene-3,17β-diol, 5 parts of acetic anhydride, and 3 parts of pyridine is allowed to stand at room temperature for about 16 hours, then is poured carefully into water. The resulting precipitate is collected by filtration, washed on the filter with water and recrystallized from acetone-hexane to yield needle-like crystals of 17α-(2-propynyl)estra-1,3,5(10) - triene-3,17β-diol 3-acetate, melting at about 167–169°. This compound is further characterized by an optical rotation of +38° in chloroform and is represented by the following structural formula

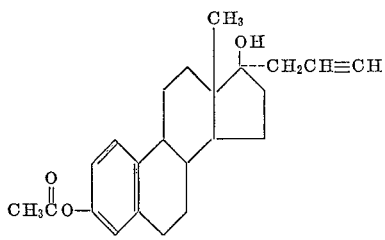

Example 3

A mixture of one part of 17α - (2 - propynyl)estra-1,3,5(10)-triene-3,17β-diol, 18.4 parts of isopropenyl acetate and 0.15 part of p-tolenesulfonic acid is slowly distilled over a period of about 9 hours. The reaction mixture is then cooled, and diluted with ether. That organic solution is washed successively with water, dilute aqueous sodium carbonate, and water, then dried over anhydrous sodium sulfate containing activated carbon and stripped of solvent at reduced pressure. The resulting oily residue is recrystallized twice from methanol to afford pure 17α-(2-propynyl)estra - 1,3,5(10) - triene - 3,17β - diol 3,17-diacetate, melting at about 140–141°. This compound is characterized further by an optical rotation, in chloroform, of +26°, by an ultraviolet absorption maximum, in chloroform, at about 275 millimicrons with a molecular extinction coefficient of about 710 and also by the following structural formula

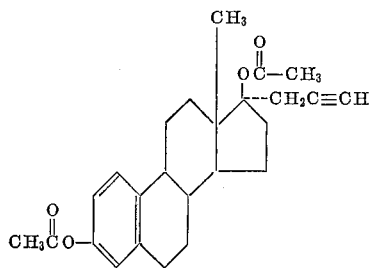

Example 4

To a mixture of 5.4 parts of magnesium turnings and 0.27 part of mercuric chloride with 140 parts of ether is added a solution of 27 parts of 1-bromo-2-butyne in 35 parts of ether. The addition is carried out with cooling and stirring in an atmosphere of nitrogen. After stirring for about 3 hours longer, a solution of 13.5 parts of 3-hydroxyestra-1,3,5(10)-trien - 17 - one in 450 parts of tetrahydrofuran is added dropwise with stirring over a period of about 2 hours. Stirring is continued with cooling by means of a cold water bath for an additional 2 hours, after which time the reaction mixture is stored at room temperature for about 16 hours. This reaction mixture is heated at the reflux temperature with stirring for about 3 hours, then cooled and diluted with 40 parts by volume of saturated aqueous ammonium chloride and approximately 30 parts or solid sodium sulfate. The resulting mixture is filtered, and the filter cake is washed with ether. Evaporation of the filtrate to dryness under reduced pressure affords a brown, gummy residue which is dissolved in approximately 150 parts by volume of 90% ethanol in acetic acid. To that solution is added 7.5 parts of Girard's-T reagent, and that mixture is heated at the reflux temperature for about 45 minutes, then cooled and poured into a mixture of ice and water. The resulting aqueous mixture is extracted with chloroform, and the organic layer is separated, dried over anhydrous sodium sulfate and stripped of solvent at reduced pressure. The resulting solid residue containing 17α - (2-butynyl)estra - 1,3,5(10) - triene - 3,17β - diol is dissolved in a mixture of 100 parts of pyridine and 10 parts of acetic anhydride and allowed to stand at room temperature for about 16 hours. This reaction mixture is then diluted with approximately 1000 parts of cold water, and the resulting aqueous mixture is extracted with ether. The ether extract is separated, washed successively with dilute hydrochloric acid, 5% aqueous sodium bicarbonate, and water, then dried over anhydrous sodium sulfate containing activated carbon and distilled to dryness under reduced pressure. Crystallization of the resulting residue from methanol affords 17α - (2 - butynyl)estra - 1,3,5(10)-triene-3,17β-diol 3-acetate, melting at about 157–159.5°. Further purification by recrystallization from acetone-hexane affords material melting at about 159–161°. This compound is characterized further by ultraviolet absorption maxima, in methanol, at about 267.5 and 275 millimicrons with molecular extinction coefficients of about 770 and 750, respectively. It exhibits an optical rotation, in chloroform, of +35.5° and is represented by the following structural formula

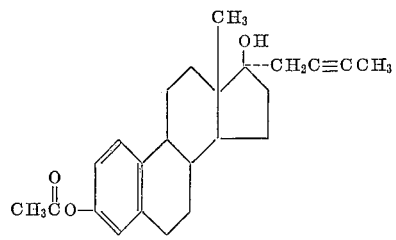

Example 5

A mixture of 3 parts of 17α-(2-butynyl)estra-1,3,5-(10)-triene-3,17β-diol 3-acetate, 1.5 parts of anhydrous potassium carbonate, and 80 parts of ethanol is heated at the reflux temperature for about 45 minutes, then is cooled and diluted with water until homogeneous. The resulting mixture is poured into approximately 500 parts by volume of 2% aqueous ammonium chloride, and the resulting precipitated product is collected by filtration, dried in air, then dissolved in a mixture of ether and ethyl acetate. The resulting organic solution is dried over anhydrous sodium sulfate containing activated carbon, then is stripped of solvent at reduced pressure to yield 17α - (2-butynyl)estra-1,3,5(10)-triene-3,17β-diol, melting at about 175–180°. Recrystallization of that product from acetone-hexane affords the pure material, melting at about 181–182.5°, and displaying an ultraviolet absorption maximum at about 280 millimicrons with a molecular extinction coefficient of about 2080. It displays also an optical rotation of +33.5° and is characterized further by the following structural formula

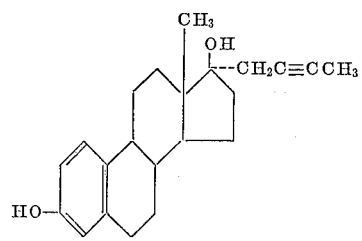

Example 6

The substitution of equivalent quantities of 1-bromo-2-pentyne and propionic anhydride for 1-bromo-2-butyne and acetic anhydride, respectively, in the procedure of Example 4 results in 17α-(2-pentynyl)estra-1,3,5(10)-triene-3,17β-diol 3-propionate.

Example 7

By substituting an equivalent quantity of propionic anhydride and otherwise proceeding according to the processes described in Example 2, 17α-(2-propynyl)estra-1,3,5(10)-triene-3,17β-diol 3-propionate is obtained.

Example 8

The saponification of an equivalent quantity of 17α-(2-pentynyl)estra - 1,3,5(10)-triene-3,17β-diol 3-propionate by the procedure described in Example 5 results in 17α-(2-pentynyl)estra-1,3,5(10)-triene-3,17β-diol.

Example 9

By substituting an equivalent quantity of isopropenyl propionate and otherwise proceeding according to the processes described in Example 3, 17α-(2-propynyl)estra-1,3,5(10)-triene-3,17β-diol, 3,17-dipropionate is obtained.

Example 10

By substituting an equivalent quantity of 17α-(2-butynyl)estra-1,3,5(10)-triene-3,17β-diol and otherwise proceeding according to the processes described in Example 3, 17α-(2-butynyl)estra-1,3,5(10)-triene-3,17β-diol 3,17-diacetate is obtained.

Example 11

The reaction of equivalent quantities of 17α-(2-pentynyl)estra - 1,3,5(10)-triene-3,17β-diol and isopropenyl propionate by the procedure described in Example 3 results in 17α-(2-pentynyl)estra-1,3,5(10)-triene-3,17β-diol 3,17-dipropionate.

Example 12

To a solution of 1.5 parts of 17α-(2-butynyl)estra-1,3,5(10)-triene-3,17β-diol 3-acetate in 40 parts of pyridine is added 0.15 part of 5% palladium-on-carbon catalyst, and the resulting mixture is shaken in a hydrogen atmosphere at atmospheric pressure and room temperature until one molecular equivalent of hydrogen is absorbed. The catalyst is removed by filtration, and the filtrate is stripped of solvent by distillation at reduced pressure. The resulting residue is dissolved in a 1:1 mixture of benzene and hexane, then is chromatographed on a silica gel column. Elution of the column with 20% ethyl acetate in benzene affords a fraction which is dissolved in ether, decolorized by treatment of that solution with activated carbon, then recrystallized from heptane to afford pure 17α-(2-butenyl)estra-1,3,5(10)-triene-3,17β-diol 3-acetate, melting at about 85–86°. Ultraviolet absorption maxima are observed at about 267.5 and 275 millimicrons with molecular extinction coefficients of about 795 and 765, repectively. It displays also an optical rotation of +48°.

Example 13

To a solution of 2 parts of 17α-(2-propynyl)estra-1,3,5(10)-triene-3,17β-diol 3,17-diacetate in 20 parts of acetone containing 8 parts of methanol is added a solution of one part of potassium carbonate in 10 parts of water, and the resulting reaction mixture is heated at 90–100° for about 15 minutes, then is allowed to stand at room temperature for about 30 minutes. The mixture is then diluted with water and extracted with ether. The organic layer is separated and stripped of solvent at reduced pressure to afford a solid residue. Crystallization from aqueous methanol affords 17α-(2-propynyl)estra-1,3,5-(10)-triene-3,17β-diol 17-acetate of the structural formula

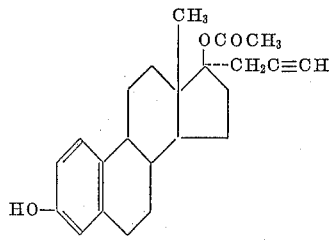

What is claimed is:
1. A compound of the formula

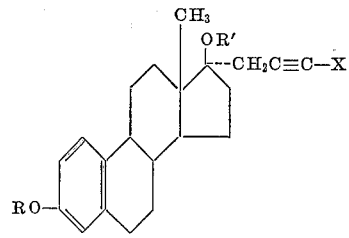

wherein X is selected from the group consisting of hydrogen and a lower alkyl radical, and R and R' are members of the class consisting of hydrogen and a lower alkanoyl radical.

2. 17α - (2-propynyl)estra-1,3,5(10)-triene-3,17β-diol.
3. A compound of the formula

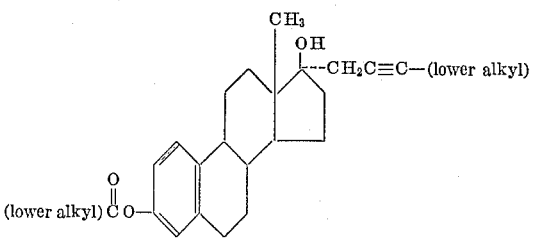

4. 17α - (2-butynyl)estra-1,3,5(10)-triene-3,17β-diol 3-acetate.
5. A compound of the formula

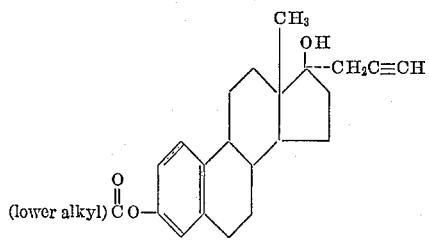

6. 17α - (2-propynyl)estra-1,3,5(10)-triene-3,17β-diol 3-acetate.
7. A compound of the formula

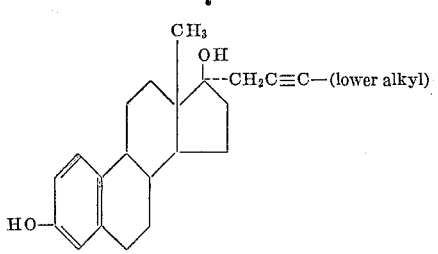
8. 17α - (2-butynyl)estra-1,3,5(10)-triene-3,17β-diol.
9. A compound of the formula
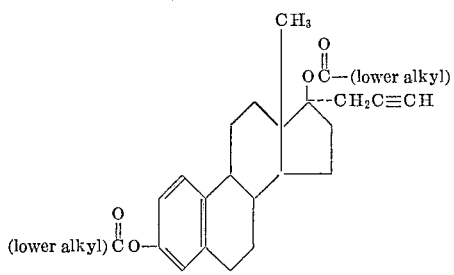
10. 17α - (2-propynyl)estra-1,3,5(10)-triene-3,17β-diol 3,17-diacetate.
11. A compound of the formula
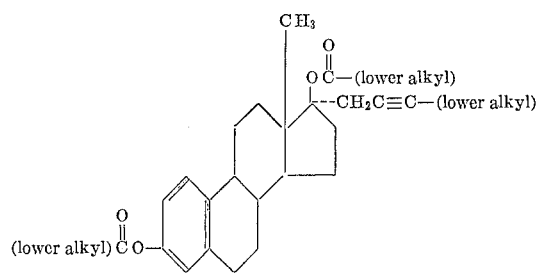
12. 17α - (2-butynyl)estra-1,3,5(10)-triene-3,17β-diol 3,17-diacetate.
References Cited by the Examiner
UNITED STATES PATENTS
2,666,769   1/54   Colton _____ 260—397.4
3,107,257  10/63   Counsell _____ 260—397.5
LEWIS GOTTS, *Primary Examiner.*